(No Model.)

3 Sheets—Sheet 1.

C. W. McLEAN.
MANUFACTURE OF GLASS COFFINS, BATH TUBS, &c.

No. 253,539.

Patented Feb. 14, 1882.

WITNESSES
G. Johnson
A. H. Betz

INVENTOR
Chr. W. McLean,
By T. C. Brecht,
his Attorney (No Model.) 3 Sheets—Sheet 2.

C. W. McLEAN.
MANUFACTURE OF GLASS COFFINS, BATH TUBS, &c.

No. 253,539. Patented Feb. 14, 1882.

(No Model.) 3 Sheets—Sheet 3.
C. W. McLEAN.
MANUFACTURE OF GLASS COFFINS, BATH TUBS, &c.

No. 253,539. Patented Feb. 14, 1882.

WITNESSES
G. Johnson
A. H. Betz

INVENTOR
Chr. W. McLean,
By T. C. Brecht
his Attorney

UNITED STATES PATENT OFFICE.

CHRISTOPHER W. McLEAN, OF NEW BERNE, NORTH CAROLINA.

MANUFACTURE OF GLASS COFFINS, BATH-TUBS, &c.

SPECIFICATION forming part of Letters Patent No. 253,539, dated February 14, 1882.

Application filed October 4, 1881. (No model.)

*To all whom it may concern:*

Be it known that I, CHRISTOPHER W. MC-LEAN, a citizen of the United States, residing at New Berne, in the county of Craven and State of North Carolina, have invented certain new and useful Improvements in the Manufacture of Glass Coffins, Bath-Tubs, &c.; and I do hereby declare the following to be a full, clear, and exact description of the invention, such as will enable others skilled in the art to which it appertains to make and use the same.

Figure 1:
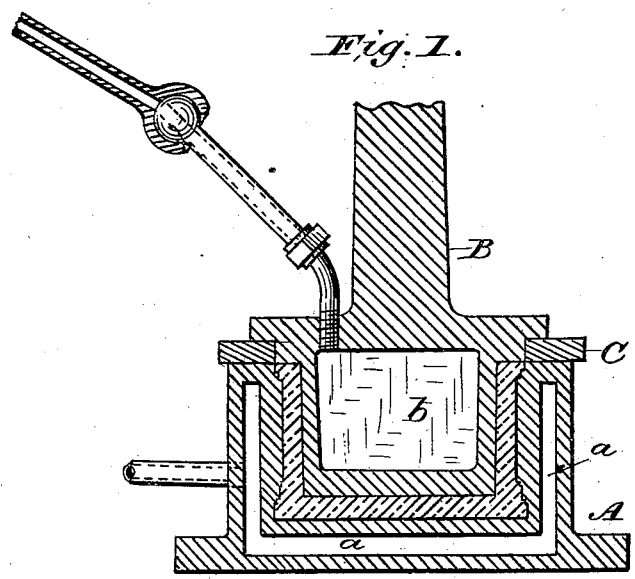
Figure 2:
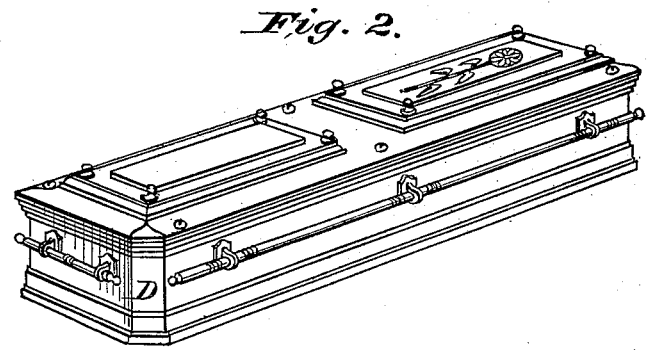
Figure 3:
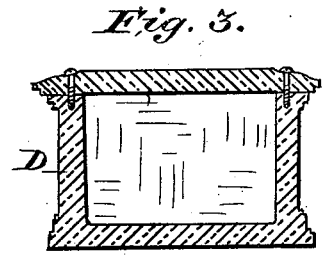
Figure 4:
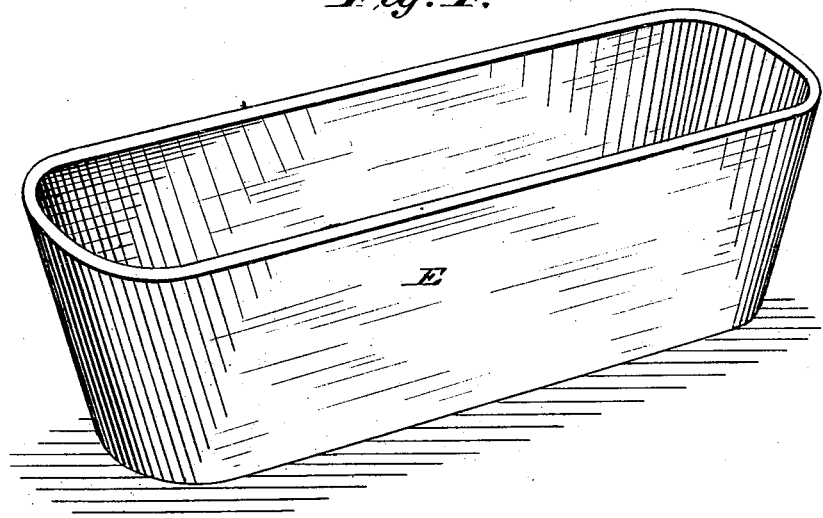
Figure 6:
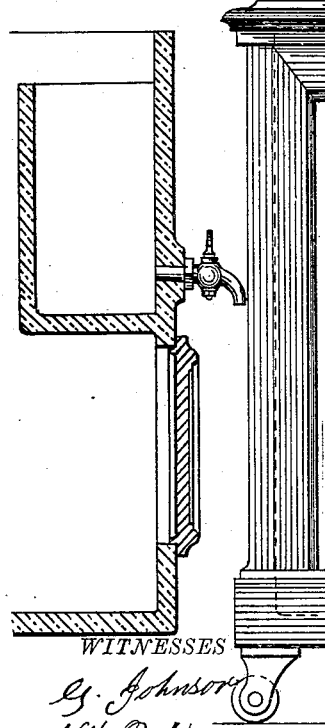
Figure 5:
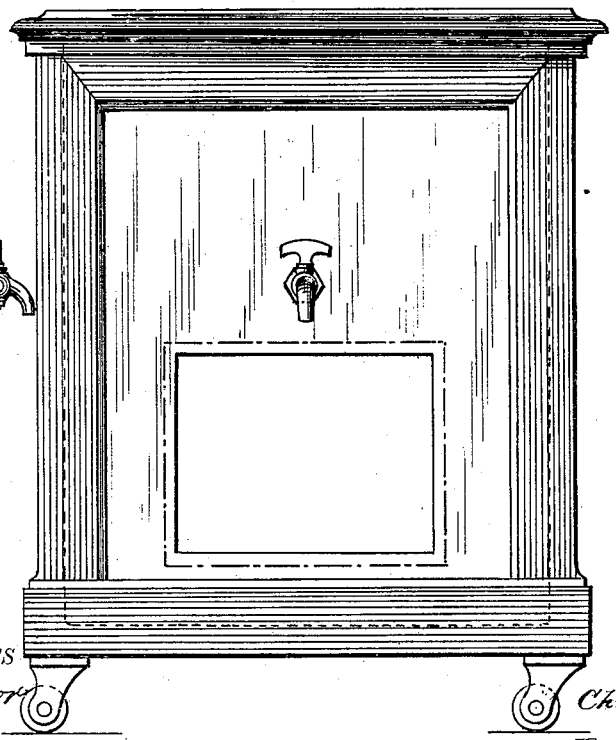
Figure 7:
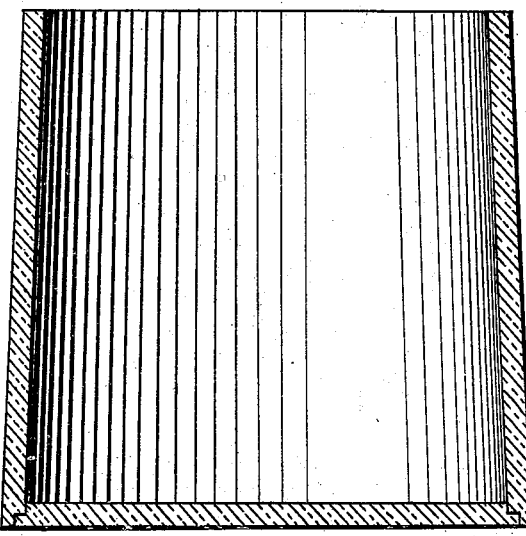
Figure 8:
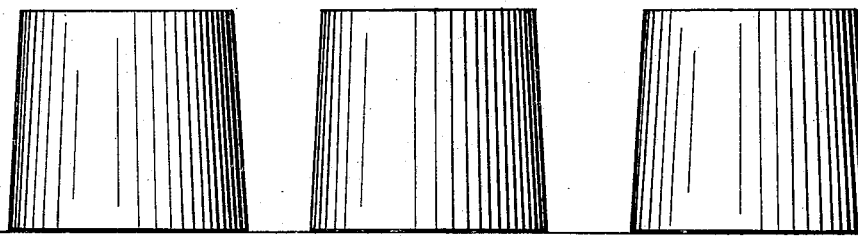
Figure 9:
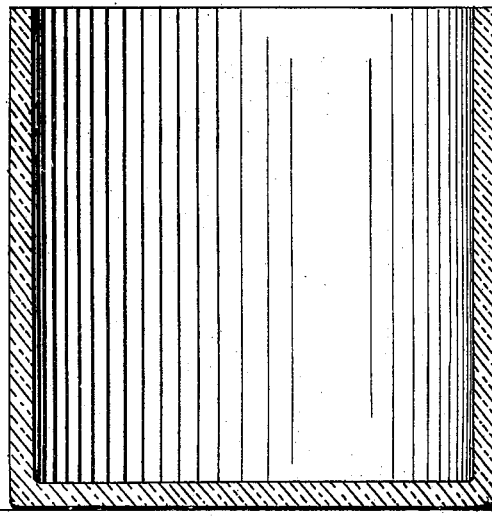

Figure 1 is a sectional view of the mold with the article and plunger therein, and showing the heating-chambers in the mold and plunger. Fig. 2 is a view of a coffin or casket made according to my invention. Fig. 3 is a cross-section of Fig. 2. Fig. 4 is a view, in perspective, of a bath-tub made according to my invention. Figs. 5 and 6 are perspective and sectional views of a refrigerator or refrigerator-lining made of glass according to my invention. Figs. 7, 8, and 9 are views of vats.

My invention relates to the manufacture of coffins, bath-tubs, sinks, and other analogous structures or vessels of glass.

The object of my invention is to produce large-sized vessels from glass, which will be more durable and cheaper in the end than the same kind of vessels as now constructed; and to this end my invention consists in pressing or casting such articles in molds having hollow sides, bottoms, and ends, whereby the same can be heated to any desired extent prior to or after the article has been formed, so that the mold can be heated to the desired temperature to prevent the chilling of the glass, and after the article is formed to increase or diminish the temperature, so that the article can be annealed while in the mold in which it is formed.

My invention consists, further, in the construction of a hollow plunger which is capable of being heated to prevent the chilling of the glass and assist in the more perfect annealing of the article.

My invention consists, further, in certain details of construction and modes of operation, hereinafter more fully set forth, and pointed out in the claims.

Referring to the drawings, A designates the mold, having its sides, ends, and bottom hollow, so as to be capable of being heated. This mold may be made in sections, hinged or otherwise secured together, so as to be readily opened to facilitate the removal of the finished article therefrom. Where, however, the article has tapering sides and ends, or is so formed that it can be removed from the mold by simply inverting the mold, the mold may be made in one piece.

*a* indicates the heating chamber or chambers in the mold, and adapted to receive the requisite heat from the furnace or other source. They may, however, be provided with suitable appliances for the burning of gas or hydrocarbons, provision being made for the requisite supply of air to support combustion, which may be accomplished by making numerous perforations through the external shell of mold.

B is the plunger, provided with an interior cavity, *b*, in which the heat is generated, or caused to pass through from other heat-source, for the proper tempering of the plunger to prevent it from chilling the glass in the mold and to assist in the annealing of the article after it has been molded. It is obvious that the plunger can be constructed with an opening or openings in the top, and charcoal or other fuel be burned therein for the proper and necessary heating of the plunger. The rim or shoulder of the plunger may be provided with a tongue for the purpose of forming a groove in the upper edge of the casket, and the lid may be pressed with a tongue to correspond with and fit into said groove for the purpose of hermetically sealing said casket.

C is the rim or plate, which may extend the desired distance over the mold to regulate the thickness of the article to be formed, and may be provided with elevations or depressions to give the necessary or desired finish to the top of the article. The mold, when made separable, may have its sides and ends formed with depressions or elevations of any desired form or configuration to impart ornamentation to the sides of the article—such as panels, figures, flowers, fruits, &c.—and also with projections for forming cavities in the sides of the article, whereby provision is made for securing handles to said article.

In Figs. 2 and 3, D indicates a coffin or casket made of glass according to my invention, and E, Fig. 4, represents a bath-tub.

In Figs. 5 and 6 I have shown linings for refrigerators, or the entire refrigerator made of glass. These rectangular or other shaped bodies, when the interiors thereof are plain sides, can be readily pressed in molds made after the manner shown in Fig. 1; but when ledges or offsets are desirable, as for shelf-supports in refrigerators, the articles may be cast as in the ordinary practice or method of casting metal.

In Figs. 7, 8, and 9 I have shown large vats for wine fermentation and brewing purposes, the advantages of which are obvious. In fermenting-vats, and also in refrigerators as now constructed, much difficulty has arisen from the trouble and expense of time and labor to keep them sweet and clean, and, moreover, their liability to rot and decay. According to my invention these objections or defects are obviated.

While I have shown and described coffins or caskets, bath-tubs, vats, refrigerators, it is obvious that many other articles—as kitchen-sinks, wash-tubs, milk-troughs, aquaria, vessels for window-gardens—may be made according to my invention.

Having thus described my invention, what I claim is—

1. In the manufacture of caskets, bath-tubs, vats, and other analogous articles of glass, the combination of the mold provided with a heating-chamber, with the plunger provided with a heating-chamber, whereby the glass is prevented from chilling in the mold and the article annealed or toughened while in said mold.

2. As a new article of manufacture, bath-tubs, caskets, vats, and other analogous articles of glass annealed or toughened throughout their entire structure, as set forth.

In testimony whereof I hereby affix my signature in presence of two witnesses.

CHRISTOPHER W. McLEAN.

Witnesses:
A. H. BETZ,
T. C. BRECHT.